United States Patent
Stuart et al.

(10) Patent No.: US 10,618,581 B2
(45) Date of Patent: Apr. 14, 2020

(54) WEAR PADS FOR SLIDER SUSPENSION

(71) Applicant: REYCO GRANNING, LLC, Mt. Vernon, MO (US)

(72) Inventors: John W. Stuart, Springfield, MO (US); John A. Hinz, Monticello, IN (US)

(73) Assignee: REYCO GRANNING, LLC, Mt. Vernon, MO (US)

( * ) Notice: Subject to any disclaimer, the term of this patent is extended or adjusted under 35 U.S.C. 154(b) by 239 days.

(21) Appl. No.: 15/436,191

(22) Filed: Feb. 17, 2017

(65) Prior Publication Data

US 2018/0237087 A1    Aug. 23, 2018

(51) Int. Cl.
*B62D 63/08*    (2006.01)
*B62D 53/06*    (2006.01)

(52) U.S. Cl.
CPC .......... *B62D 63/08* (2013.01); *B62D 53/068* (2013.01)

(58) Field of Classification Search
CPC ........ B62D 63/08; B62D 65/02; B62D 24/00; B62D 24/02; B60G 5/005; B60G 2204/17; B60G 2206/0112
See application file for complete search history.

(56) References Cited

U.S. PATENT DOCUMENTS

| 3,778,079 | A | * | 12/1973 | Vornberger | .......... B62D 53/068 280/149.2 |
|---|---|---|---|---|---|
| 4,353,597 | A | | 10/1982 | Shoup | |
| 4,761,110 | A | | 8/1988 | Boutilier | |
| 4,789,181 | A | * | 12/1988 | Baxter | ...................... B60G 5/02 280/681 |
| 4,818,006 | A | * | 4/1989 | Arndt | .................... B60P 7/0823 296/32 |
| 5,133,633 | A | | 7/1992 | Grata | |
| 5,221,103 | A | * | 6/1993 | Ehrlich | ................ B62D 53/068 280/149.2 |
| 5,335,932 | A | | 8/1994 | Pierce | |
| 5,378,006 | A | * | 1/1995 | Stuart | .................... B62D 21/14 280/149.2 |
| 5,449,187 | A | * | 9/1995 | Schueman | ............. B60G 5/005 180/209 |
| 5,460,237 | A | * | 10/1995 | Schueman | ............. B60G 5/005 180/209 |
| 5,474,149 | A | * | 12/1995 | Schueman | ............. B60G 5/005 180/209 |
| 5,476,277 | A | * | 12/1995 | Schueman | ............. B60G 5/005 180/209 |
| 5,507,511 | A | * | 4/1996 | Schueman | ............. B60G 5/005 180/209 |
| 5,531,467 | A | * | 7/1996 | Schueman | ............. B60G 5/005 180/209 |
| 5,720,489 | A | | 2/1998 | Pierce et al. | |
| 6,585,280 | B1 | * | 7/2003 | Wiers | ....................... B60D 1/18 280/468 |
| 6,637,796 | B1 | | 10/2003 | Westerdale et al. | |

(Continued)

*Primary Examiner* — Barry Gooden, Jr.
(74) *Attorney, Agent, or Firm* — Greer, Burns & Crain Ltd.

(57) ABSTRACT

A wear pad for a guide rail of a trailer with a slider suspension assembly, including at least one leg configured to be positioned between the guide rail and a frame member of the slider suspension assembly. The wear pad permits the passage of lock pins through the wear pad. A wear pad includes two legs that provide the wear pad with an L-shaped profile. One of the legs of a wear pad includes different portions with different thickness.

15 Claims, 6 Drawing Sheets

(56) References Cited

U.S. PATENT DOCUMENTS

| | | | |
|---|---|---|---|
| 7,198,298 B2 * | 4/2007 | Ramsey | B62D 53/068 |
| | | | 280/793 |
| 7,600,785 B2 | 10/2009 | Ramsey | |
| 7,635,248 B2 * | 12/2009 | Nolan | B60P 1/4421 |
| | | | 187/234 |
| 9,457,995 B2 | 10/2016 | Makovec et al. | |
| 10,226,965 B1 * | 3/2019 | Schwalbe | B60B 35/109 |
| 2005/0104316 A1 * | 5/2005 | Pappas | B62D 53/068 |
| | | | 280/149.2 |
| 2007/0216147 A1 * | 9/2007 | Ramsey | B60G 7/02 |
| | | | 280/781 |
| 2007/0228760 A1 | 10/2007 | Cramaro | |
| 2009/0279998 A1 * | 11/2009 | Fukuda | B60P 7/18 |
| | | | 414/800 |
| 2014/0373400 A1 | 12/2014 | Sheehan et al. | |
| 2017/0144501 A1 * | 5/2017 | Wall | B60G 11/28 |
| 2018/0237087 A1 * | 8/2018 | Stuart | B62D 63/08 |
| 2018/0370311 A1 * | 12/2018 | Lin | B62D 21/02 |

\* cited by examiner

WEAR PADS FOR SLIDER SUSPENSION

BACKGROUND

This disclosure relates generally to a slider suspension system for a semi-trailer, and more particularly to the wear pads installed between a sub-frame member of the slider suspension system and a guide rail of the semi-trailer.

Conventional semi-trailers of the type hauled over the road by trucks connect to the truck at a hitch or fifth wheel, and include a suspension system, typically having a pair or multiple pairs of parallel axles. In many semi-trailers, the suspension system is slidable forward and backward relative to the trailer for adjusting the load on the rear axle or axles.

A slider frame can be moved forwardly or rearwardly in relation to the tractor rear axles in order to adjust the load carrying capacity of the semi-trailer while complying with roadway weight laws. The ability to move the suspension system relative to the cargo containing portion of the semi-trailer is desirable for a number of reasons. When a tractor and semi-trailer must maneuver around city streets, relatively tight corners are common. By moving the suspension system forward, it is easier to negotiate tight corners. In contrast, when traveling on highways, moving the suspension system to the rear of the cargo container puts a larger percentage of the load on the axles of the tractor, providing a better ride.

In order to lock the position of the suspension system relative to the trailer, conventional systems include retractable pins. The pins extend through apertures in a member of the slider suspension system, typically a sub-frame member, and also extend through aligned apertures in a guide rail of the trailer. The pins are retractable to allow the position of the suspension system to change relative to the trailer. Once the desired position of the suspension system is obtained, the pins are lockingly inserted though the apertures of both the sub-frame member and the guide rail.

In conventional slider suspension systems, a wear pad is often installed between each sub-frame member and an associated guide rail. The wear pad is a planar wear resistant, low friction pad disposed between the top surface of each sub-frame member and the sliding underside surface of the guide rail.

While these wear pads provide some protection to the surfaces of the two structural members, conventional wear pads do not protect the outboard surfaces of the sub-frame and the sliding inboard surfaces of the guide rail. The lack of any protection between these two moving surfaces creates wear, friction, and noise.

Additionally, some sub-frames of the slider suspension system are made from aluminum in order to lower the weight of system. The guide rails of the semi-trailer are typically steel. When the surfaces of these two different members are exposed to water, galvanic corrosion is created on the aluminum sub-frame members.

Furthermore, there are two industry standards for the guide rails for trailers, each with a different width. This results in a need for spacers to be used with conventional wear pads to accommodate the different widths of the different guide rails for trailers.

Moreover, in conventional slider suspension systems, the wear pads are typically fastened to the sub-frame using set screws or other fasteners, such as self-tapping screws, or with slot or plug welds. These types of installation and attachment systems require excessive labor.

Accordingly, there is a need for developing an improved wear pad that addresses one or more of the above-identified drawbacks.

SUMMARY

The above-mentioned need is met or exceeded by the present wear pad for a slider suspension system. An important feature of the present wear pad is having two legs, one for each of the sets of sliding surfaces of the two structural members. With such a configuration, the wear pad increases the protection from wear and damage.

Another important feature of the present wear pad is a leg having two different thicknesses. With two different thicknesses, the wear pad reduces or eliminates the need for spacers to accommodate differently sized guide rails that are conventionally used.

Yet another important feature of the present wear pad is an attachment structure formed in an inner surface of a leg. The attachment structure engages a corresponding structure in the member of the sub-frame for a quicker installation.

Accordingly, a wear pad is provided for a slider suspension assembly, the suspension assembly including a frame and a plurality of lock pins, the frame formed by at least two main members connected by at least two cross members, each of the main members being associated with a guide rail of a trailer and having a top surface and an outer side surface, the lock pins extend out of one of the outer side surfaces and engage one of the guide rails, and each of the guide rails having a first segment with a first inner surface and a second segment with a second inner surface. The wear pad includes a first leg and a second leg joined together to provide the wear pad with an L-shaped profile, the first leg is configured to be positioned between the top surface of one of the main members and the first inner surface of one of the guide rails, and the second leg is configured to be positioned between the outer side surface of the one of the main members and the second inner surface of the associated guide rail.

Moreover, a wear pad is provided for a guide rail of a trailer with a slider suspension assembly, the slider suspension assembly including a frame and a plurality of lock pins, the frame formed by at least two main members connected by at least two cross members, each of the main members being associated with a guide rail of a trailer and having a top surface and an outer side surface, the lock pins extending out of one the outer side surfaces and configured to engage one of the guide rails, and each of the guide rails having a first segment with a first inner surface and a second segment with a second inner surface, the wear pad including at least one leg having a first portion having a first thickness and a second portion with a second thickness different than the first portion.

In addition, a suspension assembly is provided which moves in relation to a trailer, the suspension assembly includes a main frame member having a top surface and an outer side surface, a plurality of lock pins, the lock pins extending out from the outer side surface of the main frame member and configured to engage a guide rail of the trailer to lock the position of the frame member relative to the guide rail, and, a wear pad positioned between the outer side surface of the main member and the guide rail.

Additional aspects, embodiments, and details of the present disclosure, all of which may be combinable in any manner, are set forth in the following detailed description of the disclosure.

BRIEF DESCRIPTION OF THE DRAWINGS

One or more exemplary embodiments of the present disclosure will be described below in conjunction with the following drawing figures, in which.

DETAILED DESCRIPTION

With these general principles in mind, one or more embodiments of the present disclosure will be described with the understanding that the following detailed description is not intended to be limiting.

Figure 1:
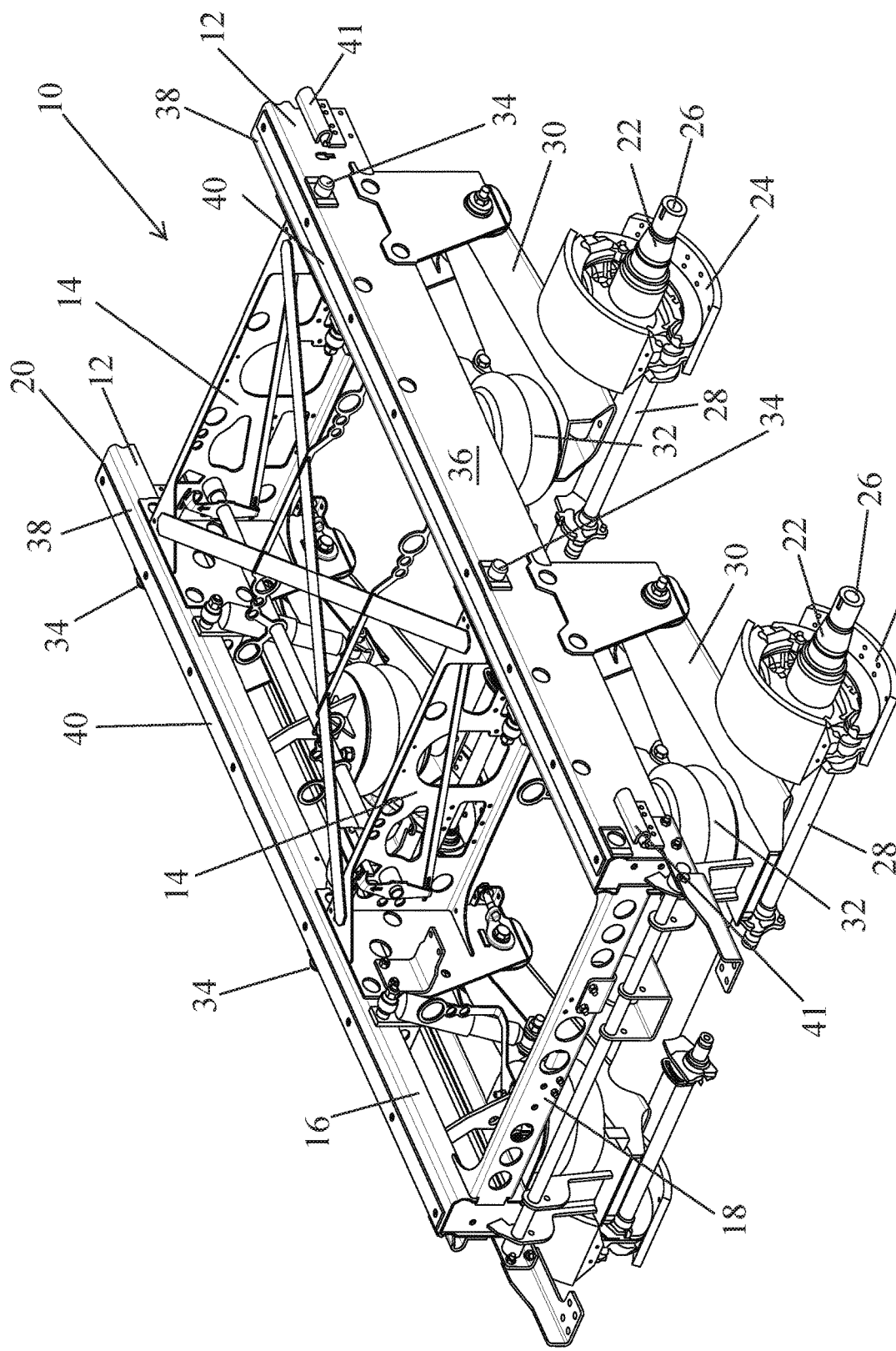
FIG. 1 is a front and side perspective view of a prior art slider suspension assembly.

Referring now to FIG. 1, a semi-trailer slider assembly is generally designated 10 and includes a pair of spaced, parallel main members 12 (sometimes referred to as "sub-frame" members) extending along a longitudinal axis of the slider, rigidly secured to each other by a pair of transverse cross members 14 by welding or other fastening technique well known in the art. Once joined, the main members 12 and the cross members 14 form a slider frame 16. As is known in the art, the slider frame 16 has a front end 18 facing a front of the trailer and the tractor (not shown), and an opposite rear end 20. Also, as is common, the semi-trailer slider assembly 10 provides for at least one and preferably a pair of sets of trailer wheel mounting points 22, each having associated brakes 24, axle spindles 26, connecting arms 28, suspension trailing arms 30, pneumatic springs 32 and other running gear components well known to those skilled in the art.

As is common with the semi-trailer slider assembly 10, at least one and preferably four outwardly biased retractable lock pins 34 extend laterally beyond outer side surfaces 36 of the associated main members 12. Thus, in the preferred semi-trailer slider assembly 10, two lock pins 34 extend from each outer side surface 36. The main members 12 include a plurality of apertures 37 allowing the lock pins 34 to be positioned in different locations relative to the main members 12.

As shown in FIG. 1, on a top surface 38 of each of the associated main members 12 is a wear pad 40. The depicted wear pad 40 is planar and protects the top surface 38 of the associated main members 12 from a corresponding surface 46 of a guide rail 42 (see FIG. 2). The guide rails 42 typically pass though rail guides 41 on the main members 12.

Figure 2:
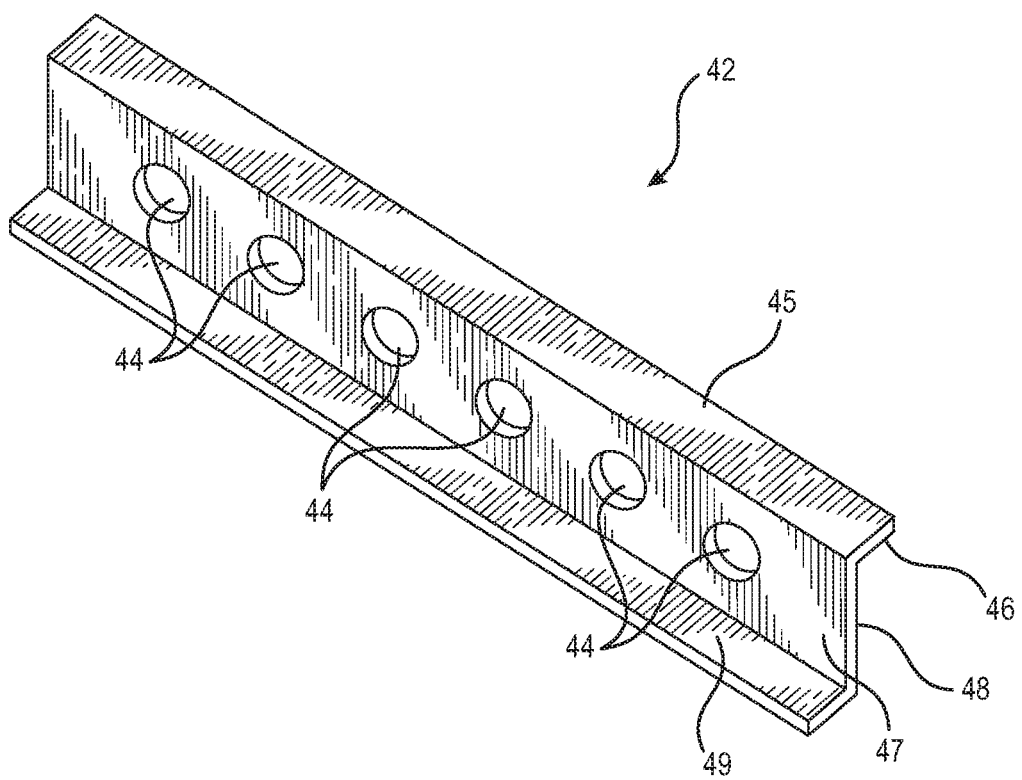
FIG. 2 is a top and side perspective view of a prior art guide rail.
Figure 3:
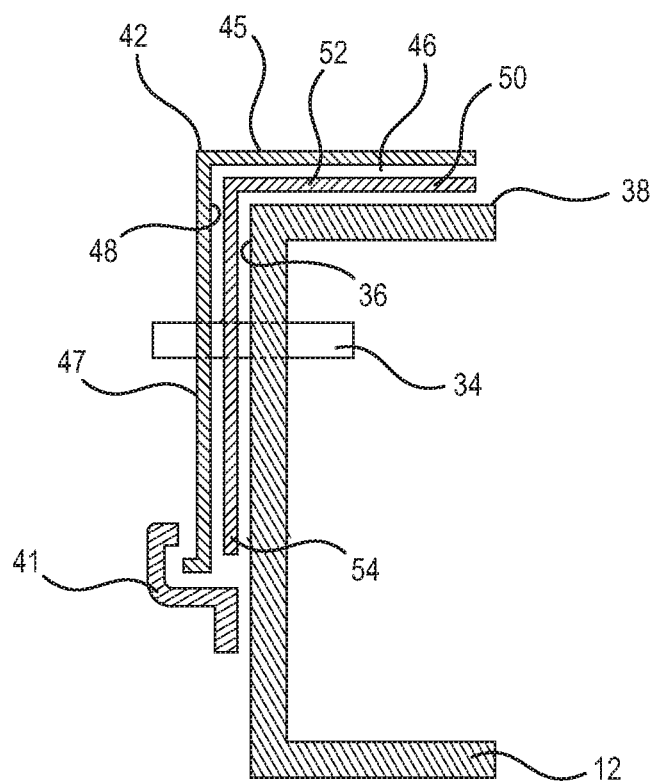
FIG. 3 is a vertical cross-section of the present wear pad installed between a member of the slider suspension assembly and the guide rail.

As seen in FIG. 2, the guide rail 42 of a trailer (not shown), includes a plurality of apertures 44 configured to receive the lock pins 34. As will be appreciated, two guide rails 42 are typically used with semi-trailer slider assembly 10 so that one guide rail 42 is associated with each of the sub-frame members 12. Once the lock pins 34 pass through the apertures 44 in the guide rail 42, the semi-trailer slider assembly 10 will be locked in the desired or selected position.

The guide rail 42 includes a plurality of planar segments 45, 47, and 49 extending parallel to the sub-frame members 12 of the slider assembly 10. The segments 45, 47, and 49 are connected at approximately 90° angles along common edges. Preferably, the first segment 45 and the third segment 49 are parallel. A first segment 45 includes an inner surface 46 to be positioned adjacent the top surface 38 of a sub-frame member 12. A second segment 47 has a second inner surface 48 to be positioned adjacent the outer side surface 36 of a sub-frame member 12. Accordingly, when the slider assembly 10 is secured to the guide rails 42, there will be two sets of sliding surfaces for each guide rail, the top surface 38 and the inner surface 46, as well as the outer side surface 36 and the inner surface 48. Conventional wear pads 40 do not provide appropriate protection to both sets of sliding surfaces.

Turning to FIGS. 3 to 9, the present wear pad is generally designated as 50 and, as mentioned above, overcomes some of the short comings of the conventional wear pads 40. As shown in FIGS. 3 to 9, the present wear pad 50 preferably includes at least one leg 52, 54. Preferably, the wear pad includes two legs 52, 54 that are connected along a common edge at approximately a 90° angle providing the wear pad 50 with an L-shaped profile (when rotated 90 degrees counter-clockwise from the view shown in FIG. 4 and viewed from the front of rear end).

A first leg 52 of the wear pad 50 is situated between the top surface 38 of the main member 12 and the inner surface 46 of the first segment 45 of the guide rail 42. A second leg 54 is situated between the outer side surface 36 of the main member 12 and the inner surface 48 of the second segment 47 of the guide rail 42. By using two legs 52, 54. The present wear pad 50 provides protection between both sets of sliding surfaces. This reduces the wear, friction, noise and damage associated the moving elements by protecting both sets of the sliding surfaces.

Furthermore, when the main members 12 and the guide rails 42 are made from different metals, the wear pad 50 protects against galvanic corrosion between the two. Accordingly, the wear pad 50 preferably is made from a material that is electrically insulative, for example, resins, polyvinylchloride, polytetrafluoroethylene, rubber, ultra-high molecular weight (UHMW) polyethylene, or high density polyethylene (HDPE), or other suitable materials.

Preferably the wear pad 50 is produced by an extrusion method which allows for the present wear pad 50 to have any number of shapes and provides benefits over current production techniques. For example, current wear pads are typically produced by cutting the wear pads out of larger sheets of finished material. This type of fabrication method wastes material and requires additional steps after the production of the finished material. In contrast, an extrusion technique provides the present wear pad 50 with reduced waste, and with fewer steps.

Figure 4:
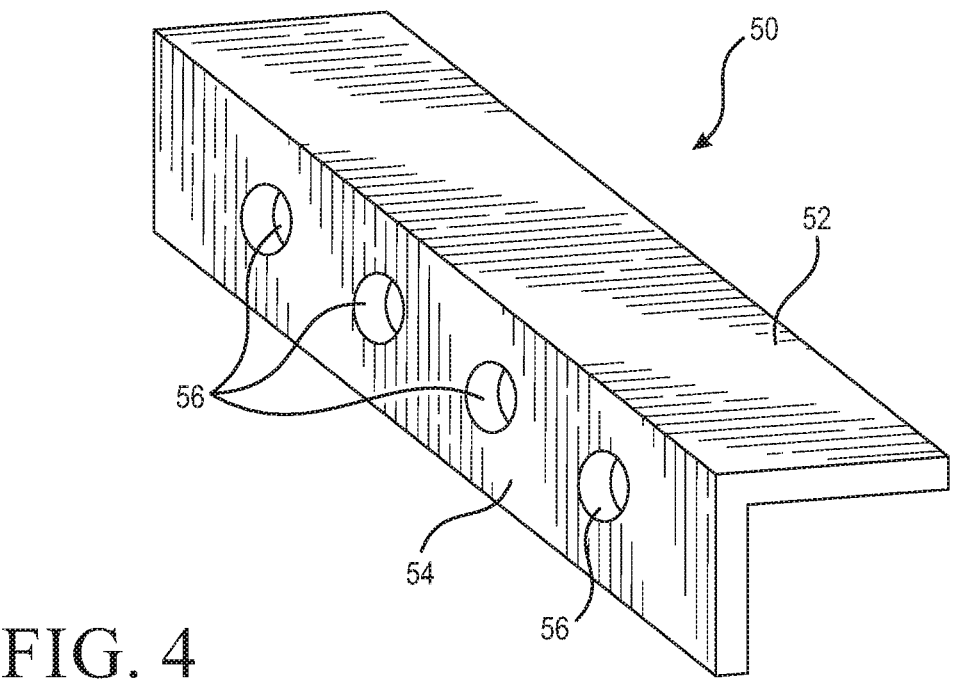
FIG. 4 is a top and side perspective view of the present wear pad.

The wear pad 50 accommodates passage of the lock pins 34 through the guide rail apertures 44 of the guide rail 42. Accordingly, as shown in FIG. 4, the second leg 54 of the wear pad 50 includes a plurality of apertures 56 that are arranged to correspond and align with the apertures 44 in the guide rails 42 and the apertures 37 in the main members 12.

Figure 5:
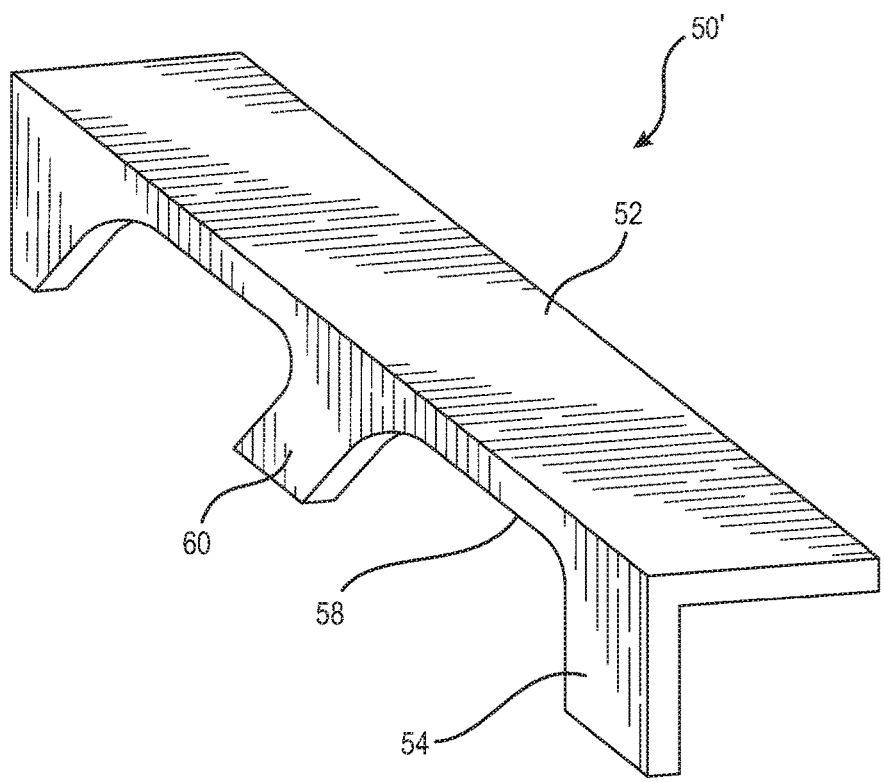
FIG. 5 is a top and side perspective view of another embodiment of the present wear pad.

Alternatively, as shown in FIG. 5 another embodiment of the present wear pad is generally designated 50'. Components shared with the wear pad 50 are designated with identical references numerals. In the wear pad 50', the second leg 54 of the wear pad 50' includes one or more longitudinally extending recesses 58. As used herein, "longitudinally extending" means extending in a direction from the front end 18 to the rear end 20 of the slider frame 16 (see, FIG. 1). The recesses 58 replace the apertures 56 and correspond to at least two apertures 37 in the main members 12 and are sized and positioned to permit the lock pins 34 to pass through to the apertures 44 of the guide rail 42.

Figure 6:
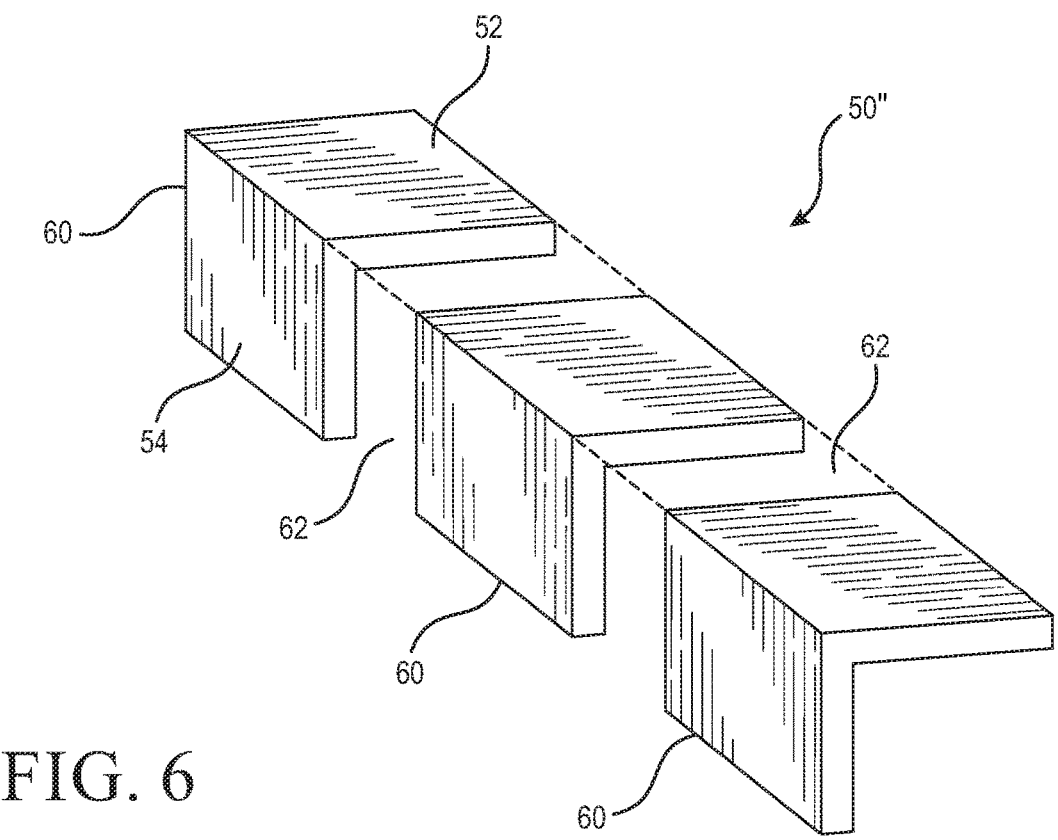
FIG. 6 is a top and side perspective view of still another embodiment of the present wear pad.

In another alternative, shown in FIG. 6, another embodiment of the present wear pad is generally designated 50". Components shared with the wear pad 50 are designated with identical references numerals. In the wear pad 50", the wear pad 50" has a plurality of sections 60 that are axially separated by gaps 62. The gaps 62 are arranged to correspond with the apertures 44 in the guide rails 42 and the apertures 37 in the main members 12 such that the gaps 62 permit passage of the lock pins 34 through to the apertures 44 of the guide rail 42.

Figure 7:
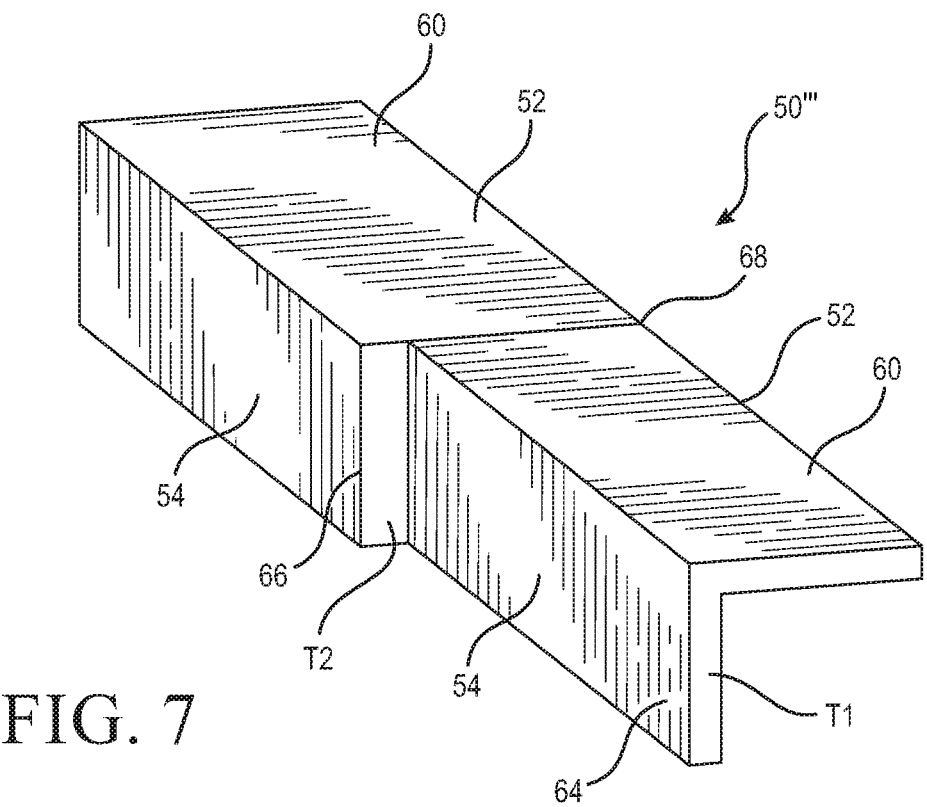
FIG. 7 is a top and side perspective view of yet another embodiment of the present wear pad.
Figure 8:
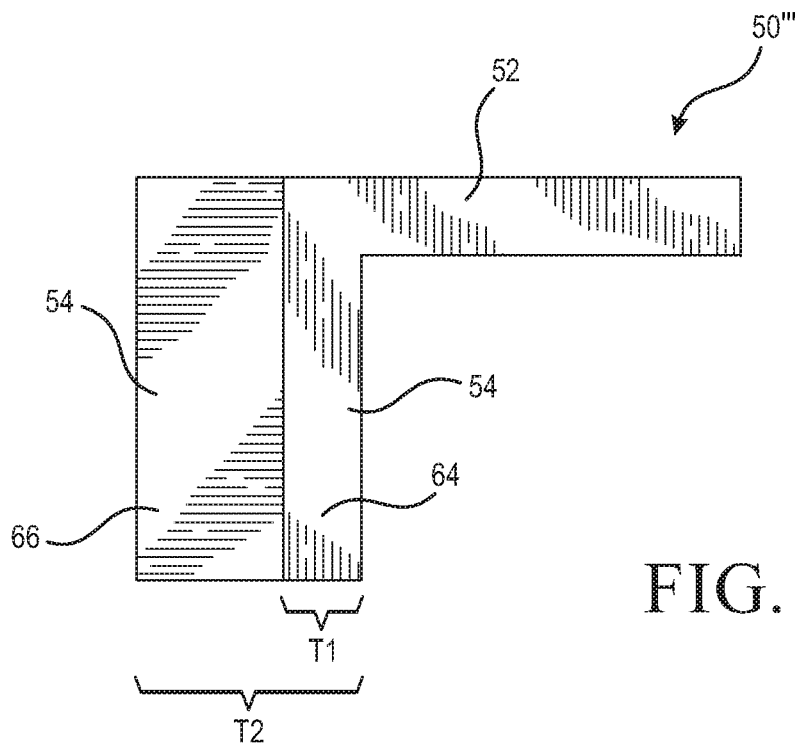
FIG. 8 is a side elevation view of the present wear pad shown in FIG. 7.

Referring now to FIGS. 7 and 8, another embodiment of the present wear pad is generally designated 50'". Components shared with the wear pad 50 are designated with identical references numerals. The wear pad 50'" accommodates both of the conventionally sized guide rails, and accordingly one of the legs 52, 54 of the wear pad 50'" optionally has different thicknesses. For example, with reference to FIGS. 7 and 8, the second leg 54 of the wear pads 50'" includes portions 64, 66 with different thickness T1, T2, with one thickness T2 being larger than the other thickness T1. The wear pad 50'" optionally has two or more sections 60 that are connected by a weldment 68 or are separated by a gap 62 (see, e.g., FIG. 6). By providing the wear pad 50'" with two different thickness T1, T2, it is no longer necessary to provide spacers with the wear pad 50'" to accommodate the two different sizes of conventional guide rails 42.

Figure 9:
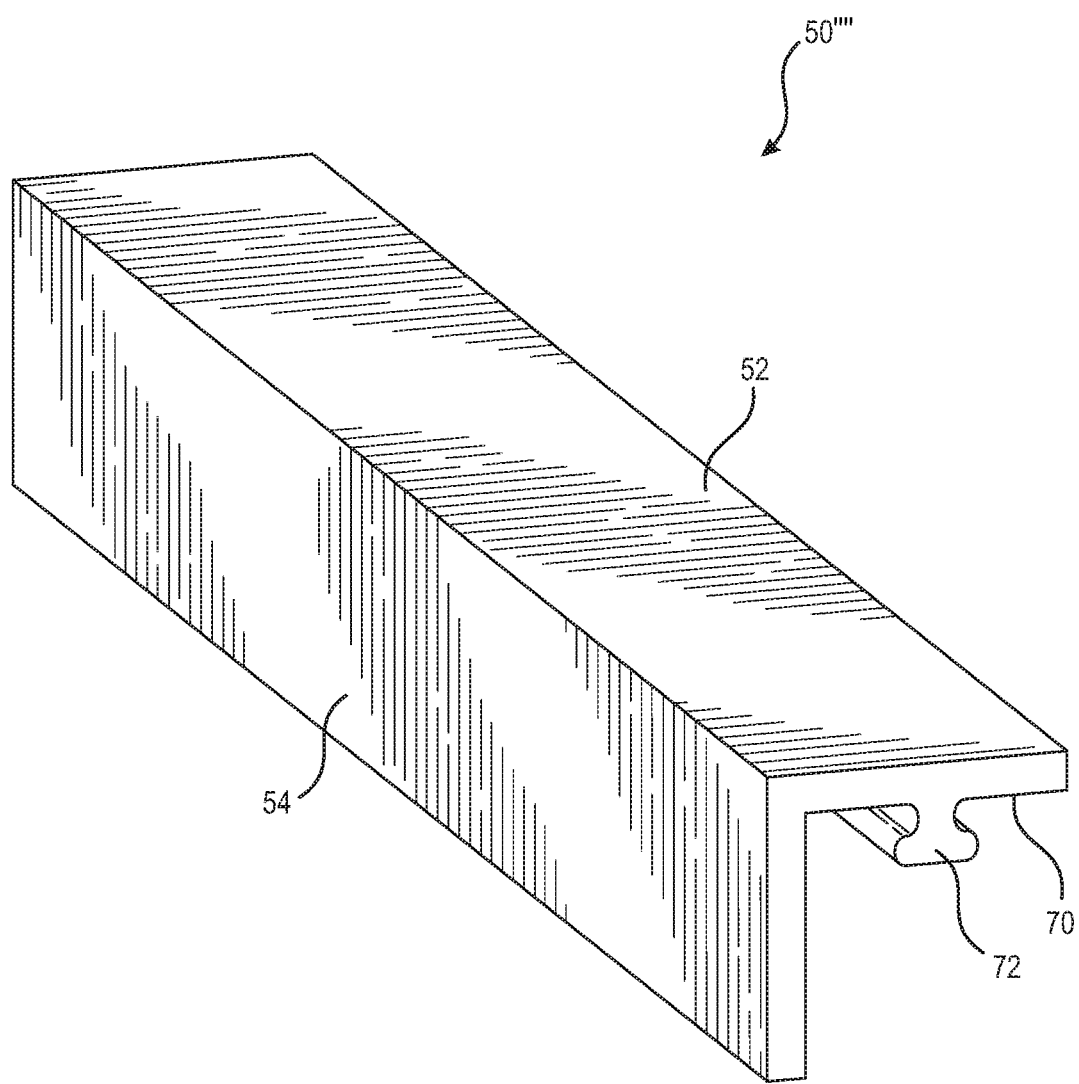
FIG. 9 is a top and side perspective view of a further embodiment of the present wear pad.

In use, the present wear pad 50, 50', 50" and 50'" is secured to each of the main members 12 of the semi-trailer slider assembly 10. The wear pad 50, 50', 50" and 50'" is securable via conventional fasteners such as threaded fasteners, rivets, plug or slot welds, adhesives, or the like. While these are believed to be sufficient, as shown in FIG. 9, one or more of the legs 52, 54 of the present wear pad 50"" optionally includes an inner surface 70 that includes an attachment structure 72.

As shown, the attachment structure 72 has a tongue-and-groove type shape that is integrally formed in the wear pad 50"" and is configured to engage a complementarily configured structure on the main member 12. For example, the main member optionally includes a complementarily channel, or a blind bore to engage the attachment structure 72. It is preferred that the attachment structure 72 is formed by an extrusion process along with the wear pad 50. The attachment structure 72 is believed to provide for a faster and easier installation compared to conventional fasteners. However, as noted above, the present wear pad 50"" is not limited to the attachment structure 72. Additionally, while the attachment structure 72 is depicted on the inner surface 70 of one leg 52, it is contemplated, but not shown, that the attachment structure 72 is disposed on the inner surface of the other leg 54.

Compared to existing wear pads, the present wear pad provides increased protection against, wear, noise, damage, and galvanic corrosion. Additionally, the wear pad is believed to reduce the need for spaces and is believed to be easier to install.

Additionally, it should be appreciated that one or more aspects from any one of the present wear pads 50, 50', 50", 50'", and 50"" are combinable with any aspect from any of the other present wear pads 50, 50', 50", 50'", and 50"".

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure, it being understood that various changes may be made in the function and arrangement of elements described in an exemplary embodiment without departing from the scope of the disclosure.

What is claimed is:

1. A wear pad for a slider suspension assembly, and said slider suspension assembly having a frame and a plurality of lock pins, said frame formed by at least two main members connected by at least two cross members, each of said main members being associated with a guide rail of a trailer and having a top surface and an outer side surface, at least one of said plurality of lock pins extending out of each one of said outer side surfaces and engaging one of said guide rails, and each of said guide rails provided with a first segment with a first inner surface and a second segment with a second inner surface, the wear pad comprising:
   a first leg and a second leg joined together to provide the wear pad with an L-shaped profile; and,
   a longitudinally extending recess arranged to allow two lock pins from the plurality of lock pins to pass through the second leg;
   wherein the first leg is configured to be positioned between said top surface of one of said main members and said first inner surface of one of said guide rails, and
   wherein the second leg is configured to be positioned between said outer side surface of the one of said main members and said second inner surface of the one of said guide rails.

2. The wear pad of claim 1 wherein the second leg of the wear pad includes a plurality of said longitudinally extending recesses.

3. The wear pad of claim 1 wherein at least one of the first leg of the wear pad and the second leg of the wear pad include an attachment structure.

4. The wear pad of claim 1 wherein the second leg includes a first portion having a first thickness, and a second portion with a second thickness different than the first portion.

5. The wear pad of claim 4 wherein the first portion of the second leg and the second portion of the second leg are joined together.

6. A wear pad for a slider suspension assembly, said slider suspension assembly having a frame and a plurality of lock pins, said frame formed by at least two main members connected by at least two cross members, each of said main members being associated with a guide rail of a trailer and having a top surface and an outer side surface, at least one of said plurality of lock pins extending out of each one said outer side surfaces and configured to engage one of said guide rails, and each of said guide rails provided with a first segment with a first inner surface and a second segment with a second inner surface, the wear pad comprising:

at least one leg, the at least one leg comprising:
a first portion having a first thickness;
a second portion with a second thickness different than the first portion; and,
a plurality of apertures each sized to permit a lock pin from the plurality of lock pins to pass through the at least one leg.

7. The wear pad of claim 6 wherein the first portion and the second portion are joined together.

8. The wear pad of claim 6 wherein the at least one leg further comprises a first section longitudinally spaced from a second section to permit a lock pin from the plurality of lock pins to pass through the at least one leg.

9. The wear pad of claim 6 wherein the at least one leg further comprises at least one longitudinally extending recess configured to permit a lock pin from the plurality of lock pins to pass through the at least one leg.

10. The wear pad of claim 6 wherein the at least one leg further comprises an attachment structure.

11. A wear pad for a slider suspension assembly, and said slider suspension assembly having a frame and a plurality of lock pins, said frame formed by at least two main members connected by at least two cross members, each of said main members being associated with a guide rail of a trailer and having a top surface and an outer side surface, at least one of said plurality of lock pins extending out of each one of said outer side surfaces and engaging one of said guide rails, and each of said guide rails provided with a first segment with a first inner surface and a second segment with a second inner surface, the wear pad comprising:

a first leg and a second leg joined together to provide the wear pad with an L-shaped profile,
wherein the first leg is configured to be positioned between said top surface of one of said main members and said first inner surface of one of said guide rails, and
wherein the second leg is configured to be positioned between said outer side surface of the one of said main members and said second inner surface of the one of said guide rails, and,
wherein the second leg includes a first portion having a first thickness, and a second portion with a second thickness different than the first portion.

12. The wear pad of claim 11 wherein the second leg of the wear pad includes a plurality of apertures sized to permit a lock pin from the plurality of lock pins to pass through the second leg.

13. The wear pad of claim 11 wherein the second leg of the wear pad includes at least one longitudinally extending recess configured to permit a lock pin from the plurality of lock pins to pass through the at least one leg.

14. The wear pad of claim 11 wherein the first portion of the second leg and the second portion of the second leg are joined together.

15. The wear pad of claim 11 wherein at least one of the first leg of the wear pad and the second leg of the wear pad include an attachment structure.

\* \* \* \* \*